(12) United States Patent
Voitl et al.

(10) Patent No.: US 7,906,687 B2
(45) Date of Patent: Mar. 15, 2011

(54) METHOD FOR THE BREAKDOWN OF LIGNIN

(75) Inventors: Tobias Voitl, Zurich (CH); Philipp Rudolf Von Rohr, Muttenz (CH)

(73) Assignee: Eth Zurich, Zurich (CH)

( * ) Notice: Subject to any disclaimer, the term of this patent is extended or adjusted under 35 U.S.C. 154(b) by 0 days.

(21) Appl. No.: 12/449,845

(22) PCT Filed: Feb. 25, 2008

(86) PCT No.: PCT/CH2008/000078
§ 371 (c)(1),
(2), (4) Date: Nov. 23, 2009

(87) PCT Pub. No.: WO2008/106811
PCT Pub. Date: Sep. 12, 2008

(65) Prior Publication Data
US 2010/0121110 A1    May 13, 2010

(30) Foreign Application Priority Data

Mar. 2, 2007 (CH) .......................... 338/07
Oct. 12, 2007 (CH) ....................... 1595/07

(51) Int. Cl.
*C07C 45/00* (2006.01)
*C07C 69/00* (2006.01)

(52) U.S. Cl. .............................. 568/426; 560/53; 560/64

(58) Field of Classification Search .................. 568/426; 560/53, 64
See application file for complete search history.

(56) References Cited

U.S. PATENT DOCUMENTS

| 5,302,248 A | 4/1994 | Weinstock et al. |
| 5,552,019 A | 9/1996 | Weinstock et al. |
| 5,695,606 A | 12/1997 | Atalla |

FOREIGN PATENT DOCUMENTS

| EP | 0 286 630 A1 | 10/1988 |
| WO | WO 95/26438 A1 | 10/1995 |
| WO | WO 00/71247 A1 | 11/2000 |

OTHER PUBLICATIONS

Hill, *Chemical Reviews*, vol. 98, No. 1, Jan./Feb. 1998, pp. 1-389.
Okuhara et al., "Catalysis by heteropoly compounds-recent developments," *Applied Catalysis A: General*, vol. 222, 2001, pp. 63-77.
Wu et al., "Improved Alkaline Oxidation Process for the Production of Aldehydes (Vanillin and Syringaldehyde) from Steam-Explosion Hardwood Lignin," *Ind. Eng. Chem. Res.*, vol. 33, Mar. 1994, pp. 718-723.
International Search Report issued for International Application No. PCT/CH2008/000078 on May 29, 2008 (with translation).

*Primary Examiner* — Sikarl A Witherspoon
(74) *Attorney, Agent, or Firm* — Oliff & Berridge, PLC

(57) ABSTRACT

The invention describes a method for the direct production of molecules with a minimum molecular weight of 78 g/mol by the breakdown of lignin, lignin derivatives, lignin fragments, and/or lignin-containing substances or mixtures in the presence of at least one polyoxometallate and preferably in the presence of a radical scavenger in a liquid medium.

17 Claims, 1 Drawing Sheet

METHOD FOR THE BREAKDOWN OF LIGNIN

TECHNICAL FIELD

The present invention relates to the controlled conversion of lignin to chemicals.

STATE OF THE ART

Alternative processes for producing chemical from biomass are gaining increasing significance as fossil raw materials become more scarce.

For example, processes which obtain fuels from the cellulose or hemicellulose component of plants have been developed. Renewable vegetable raw materials comprise, as well as cellulose and hemicellulose, also lignin, lignin being the second most common organic substance on earth after cellulose.

Lignin is a main constituent of plants, with the function of imparting stiffness to the cell structure. The lignin content may vary from plant to plant. The chemical structure of lignin likewise has plant-specific differences. For instance, the lignin macromolecule, according to the plant type, is composed of different ratios of the coniferyl alcohol, sinapyl alcohol and cumaryl alcohol monomers, the proportion of coniferyl alcohol being dominant in many cases (especially in the case of softwoods). Moreover, there exist numerous processes for removing the lignin from the other cell wall constituents, some of which considerably modify the chemical structure of the natural lignin.

While various processes for producing chemicals from cellulose have reached the large industrial scale, there are currently still barely any economically viable means of using the lignin component of biomass as a starting material for producing chemicals. In papermaking, large amounts of lignin are obtained as a by-product or waste product. Only 1-2% of the about 50 million tonnes of lignin obtained annually in papermaking are further processed commercially.

The use of lignin is limited principally to relatively inexpensive dispersants and binders. Vanillin is the only lignin-based phenolic product which is produced commercially. A portion of global vanillin production (12 000 tonnes/year) is achieved by oxidative degradation of lignosulfonic acids.

The literature describes numerous methods of using lignin as a raw material. A frequently used approach is the gasification of biomass at high temperatures (800-1000° C.) with air and/or steam to give synthesis gas ($CO$, $H_2$, $CO_2$ and $CH_4$). In further stages, various commodity chemicals, such as methanol, ether, formic acid and higher molecular weight hydrocarbons (by means of Fischer-Tropsch), can be prepared from this synthesis gas.

In these methods, the complex chemical structure originally present is completely lost. This decomposition and recombination strategy requires a very large amount of energy and produces undesired by-products. In addition, this process can produce only relatively simple, cheap molecules. For economic viability, very large conversions are therefore necessary. Alternatively, various methods (for example oxidative and nonoxidative hydrolysis, hydrogenolysis, pyrolysis) are known for direct preparation of monomeric or low molecular weight chemicals. While these methods are suitable for separating lignin into smaller fractions, no method is selective enough to produce a single product in high yield.

SUMMARY OF THE INVENTION

The inventive method proposed here differs significantly in terms of concept from approaches to date.

The attempts described in the literature to convert lignin to monomeric chemicals are limited to purely physical methods (high temperature and pressure), simple acid- or base-catalyzed hydrolysis or biotechnology.

On closer inspection of the chemistry, it becomes clear that these relatively simple methods are not suitable for achieving a high yield of monomeric chemicals.

The reason for this lies in the fact that the desired products in the conversion of the lignin are degradation products. These degradation products cannot be obtained in large amounts by means of simple methods, owing to further reactions.

The invention takes account of the task of maximizing the yield of degradation products, which is complex from a chemical point of view, in two ways. Firstly, the conversion of lignin is performed in the presence of a catalytic system.

This catalytic system comprises what are known as polyoxometalates, which enables the selective scission of bonds even at relatively low temperatures.

Secondly, what are known as free-radical scavengers are added to the reaction mixture. These prevent repolymerization reactions or combination reactions of lignin fragments, and stabilize the desired target products.

A benchmark which can be employed for the invention presented here is the alkaline oxidation of lignin. The conversion of 10 g of a hardwood lignin (steam digestion) under 1.4 MPa oxygen at 170° C. using a Cu(II)/Fe(III) catalyst results in 4.7% by weight of vanillin and 9.5% by weight of syringaldehyde. In a very similar study on hardwood lignin, the yield of aldehydes (vanillin and syringaldehyde) was 15% by weight.

Various polyoxometalates have already been used for delignification and patented, as described, for example, in U.S. Pat. No. 5,302,248, U.S. Pat. No. 5,552,019 or WO 95/26438. In these methods, the unbleached fibrous substance is treated in a first process step with an aqueous polyoxometalate solution (e.g.: $Na_7AlVW_{11}O_{40}$) under an inert atmosphere, the lignin being converted at the end to carbon dioxide and water.

These processes pursue exclusively the aim of freeing cellulose from undesired lignin. The lignin should be converted fully to $CO_2$ and $H_2O$, without destroying the cellulose. The possibility of directly obtaining degradation products or chemicals by treatment with polyoxometalates was not considered.

The aim of the invention is thus to directly convert lignin to chemicals by means of polyoxometalates. In this invention, as well as polyoxometalates, what are known as free-radical scavengers can be used.

The terms "lignin" and "polyoxometalates" each encompass whole classes of substances and are therefore presented briefly hereinafter.

There is also a definition of how the terms "free-radical scavenger" and "chemicals" should be understood in the context of this document.

Lignin:

It is possible by the method presented in this invention to obtain chemicals from all lignin types irrespective or origin and pretreatment. It is also possible to undertake a controlled pretreatment of the lignin used in order, for example, to modify the solubility in organic or inorganic solvent. It is also possible to use an already partly decomposed lignin. It is also possible to use lignin-containing biomass, for example wood, without preceding removal of the lignin content of the biomass.

Polyoxometalates:

Polyoxometalates form part of the compound class of the metal-oxygen cluster anions. Polyoxometalates are notable, among other features, for their usually simple synthesis, their structural modifiability and their specific redox behavior. Key properties which are important for many reaction systems, for example solubility behavior in organic/inorganic media, redox potential and pH, can be adjusted by controlled synthesis. The polyoxometalates are synthesized here usually in one stage by heating an acidic aqueous solution which comprises all constituents in the desired stoichiometric ratio. The polyoxometalate, or the polyoxometalate mixture, thus arises from the amounts of the components used. It thus also becomes clear that there is a great variety of polyoxometalates. In the literature, the following two terms have become established for structurally different polyoxometalates: "isopolyanions" and "heteropolyanions". These anions are represented by the following general empirical formula:

$[M_mO_y]^{p-}$ isopolyanions $[X_xM_mO_y]^{q-}$ (x≠m) heteropolyanions

The "M" part is termed addenda atom, and the "X" part is referred to as heteroatom. In this document, the term "polyoxometalates" includes both anion types: isopoly- and heteropolyanions.

An important subgroup within the polyoxometalates is that of the heteropolyacids. Heteropolyacids are very strong acids which are composed of heteropolyanions with protons as countercations. In the case that all countercations consist of other elements, reference is also made to heteropolysalts. A series of these polyoxometalates have been found to be of particular interest for catalysis.

The most common addenda atoms ("M") are molybdenum or tungsten; less common are vanadium or niobium, or mixtures of these elements in the highest oxidation states ($d^0$, $d^1$). Useful heteroatoms ("X") include essentially all elements in the periodic table. The elements $P^{5+}$, $Si^{4+}$, $As^{5+}$, $Ge^{4+}$, $B^{3+}$ are the most frequently mentioned in connection with polyoxometalates used catalytically.

Compared to the very large number of polyoxometalates, currently only few polyoxometalates are being used as catalysts, these being restricted principally to the class of the Keggin anions and the derived structures thereof. It is therefore usually sufficient to use a very simplified nomenclature. This treats polyoxometalates as quasi-coordinated complexes. If a heteroatom is present, it is considered as the central atom of the complex, which is surrounded by the addenda parts as ligands. In the empirical formula of the heteropolyanions, the heteroatoms precede the addenda atoms, and the countercations precede the heteroatoms. The heteropolyanion is placed between square brackets and is thus separated from the countercations.

This should be clarified in the following examples:

$[SiW_{12}O_{40}]^{4-}$ 12-tungstosilicate $H_3[PMP_{12}O_{40}]$ 12-phosphomolybdic acid Sometimes, in the simplified representation, the countercations, the charge of the polyanion and even the oxygen atoms are not stated explicitly. $Na_6[P_2Mo_{18}O_{62}]$ can thus be represented as $[P_2Mo_{18}O_{62}]$ or even $P_2Mo_{18}$.

Every polyoxometalate (isopoly- and heteropolyanions), and acids, salts and partial salts thereof, can be used for this invention irrespective of the preparation process. It is also possible to use mixtures of different polyoxometalates. In fact, depending on the pH, many species may be present in solution in equilibrium alongside one another, and a compound isolated in crystalline form need not necessarily even be the main component.

The polyoxometalates used can preferably be oxidized and reduced reversibly, which is the case for all polyoxometalates of the Keggin and Wells/Dawson structures. A preferred class of polyoxometalates is that of components of the $[Y_{3-18}]^{n+}[X_{1-4}M_{1-36}O_{10-60}]^{n-}$ form where each "X" is selectable freely from the elements of the periodic table and/or may also be a molecular portion with four or fewer atoms. "M" is freely selectable from the group of the metals, "Y" represents countercations and "n" is an integer. A further preferred class is that of polyoxometalates of the $[Y_{3-18}]^{n+}[M_{1-36}O_{10-60}]^{n-}$ form where "Y", "M" and "n" are each as defined above.

In the preferred embodiments, each "X" is selected freely from the group of the elements P, Si, As, Ge, B, Al, Co, S, Fe. Each "M" is preferably selected freely from the following group: Mo, W, V, Ti, Co, Cu, Zn, Fe, Ni, Mn, Cr, lanthanides, Ce, Al, Ga, In, Tl. The countercations "Y" are preferably selected freely from the group of H, Zn, Co, Cu, Bi, Na, Li, K, Rb, Cs, Ba, Mg, Sr, ammonium, $C_{1-12}$-alkylammonium and $C_{1-12}$-alkylamine.

In a particularly preferred embodiment, polyoxometalates of the $[Y]^{n+}[XM_{12}O_{40}]^{n-}$ form are used, where the same definitions for "Y", "X", "M" and "n" as above apply. The most preferred polyoxometalates are of the $[Y]^{n+}[XM_{12}O_{40}]^{n-}$ form where "Y" and "n" are each as defined above, "X" is Si, P, Ge or As, and each "M" is selected freely from Mo, V and W.

In a further preferred embodiment, polyoxometalates according to the definitions specified above which have been applied to a suitable support material are used. The application of a polyoxometalate to a support material, for example $SiO_2$, $Al_2O_3$ and zeolites, and the use thereof as a heterogeneous catalyst for, for example, oxidations with oxygen, have already been described in the literature.

With regard to possible polyoxometalates, reference is made to the systems as described in Hill (1998) Chemical Reviews 98: 1-389; Pope (1983) Heteropoly and Isopoly Oxometalates, Springer, Berlin and Okuhara et al. (2001) Applied Catalysis A: General 222: 63-77, the disclosure content of which is incorporated explicitly in this regard.

For the sake of simplicity, the abbreviation "POM" is used hereinafter for polyoxometalates according to the definitions specified above.

Free-Radical Scavenger:

In a preferred embodiment of the invention, one or more components are used as free-radical scavengers.

In the context of this invention, free-radical scavengers serve to scavenge the free radicals formed during the degradation of lignin and hence to reduce repolymerization reactions. More particularly, this should increase the yield of desired chemicals.

Useful free-radical scavengers are generally all components which, under the given conditions, form radicals in one or more steps or are already present as free radicals.

The mode of function of the free-radical scavenger is illustrated in the following illustrative and incomplete reaction scheme. The mechanisms proposed here reflect the present state of knowledge and should not be interpreted as a restriction of the invention.

Considering, for example, two free radicals R. and R'. which form in the cleavage of lignin and hence constitute lignin fragments, it is then possible that the coupling of the lignin fragments to one another leads to the formation of stable bonds and hence has a counterproductive effect to the desired cleavage of lignin fragments (equation 1). In the case of addition of free-radical scavengers which form S. radicals or are already present as free radicals, it is possible that the lignin fragments R. and R'. are converted to the coupling products R—S and R'—S (equations 2 and 3).

It is thus possible to reduce the repolymerization of lignin fragments by controlled coupling with S. radicals:

$$R. + R'. \rightarrow R-R' \quad (1)$$

$$R. + S. \rightarrow R-S \quad (2)$$

$$R'. + S. \rightarrow R'-S \quad (3)$$

It is possible, for example, to use free-radical scavengers which are already present as free radicals in the S. form. An example is TEMPO (2,2,6,6-tetramethylpiperidine 1-oxyl), which is used, for example, as a free-radical scavenger in living free-radical polymerization.

It is also possible to use free-radical scavengers which can form free radicals through homolytic scission of a covalent bond (equation 4). From a thermodynamic point of view, in the selection of the free-radical scavenger, a relatively low bond energy of the S—S' bond compared to the bonding energies of the possible coupling products R—S, R'—S, R—S' and R'—S' is preferable. Examples are dimethyl ether, diethyl ether, peroxides.

$$S-S' \rightarrow S. + S'. \quad (4)$$

It is also possible to use free-radical scavengers which form free radicals in a plurality of steps. Especially in conjunction with catalysts, a plurality of steps may form a free radical S. . For example, acid-catalyzed condensation of methanol to dimethyl ether in the presence of POM as an acid catalyst with subsequent homolytic scission of the ether bond can lead to the $CH_3O$. and $CH_3$. radicals.

The free-radical scavenger can firstly serve as a hydrogen donor and secondly prevent the repolymerization of the lignin fragments. Consequently components of the general form S—H are possible, where H represents a hydrogen atom available for reaction and S denotes the rest of the free-radical scavenger, i.e. minus the hydrogen atom in question. The free-radical scavenger may possess a plurality of accessible hydrogen atoms.

The mode of function of the free-radical scavenger is illustrated in the illustrative second reaction scheme which follows. By way of example, free radicals which have formed through cleavage of an ether bond of lignin (equation 5) are now considered, where R again represents lignin fragments.

The reaction scheme which follows serves again merely to illustrate a possible free-radical scavenger mechanism. The free-radical scavenger need not be activated in one step, nor by pure hydrogen abstraction. In fact, free radicals, in particular in the presence of POMs and/or oxygen, can take part in a variety of reactions. For example, free radicals of the R. (or S.) form, in the presence of oxygen, form free radicals of the ROO. (or SOO.) form. Owing to the sometimes very strong tendency of POMs to take up electrons (and protons), there may additionally be interaction of POM with free-radical scavengers. It should be noted at this point that phenolic degradation products of lignin are themselves free-radical scavengers.

$$R-O-R. \rightarrow RO. + R. \quad (5)$$

$$RO. + S-H \rightarrow ROH + S. \quad (6)$$

$$R. + S-H \rightarrow RH + S. \quad (7)$$

$$S. + S. \rightarrow S-S \quad (8)$$

$$S. + R. \rightarrow S-R \quad (9)$$

$$S. + RO. \rightarrow R-O-S \quad (10)$$

Abstraction of a hydrogen atom from the free-radical scavenger can provide the desired degradation products of lignin ROH and RH (equations 6 and 7). In addition, it is also possible that the rest of the free-radical scavenger (i.e. minus a hydrogen atom) is integrated into the product, thus reducing free-radical repolymerization reactions (equations 9 and 10).

In principle, useful free-radical scavengers include, for example, molecules which can release hydrogen atoms under the given conditions. Therefore, when the chemical structure is considered, $H_2$ is the simplest free-radical scavenger. Alcohols and acids are also possible.

It is also possible, as explained above, to use, as free-radical scavengers, substances which form free radicals under the given conditions without hydrogen abstraction, for example peroxides, including hydrogen peroxide and the like.

Chemicals:

The structure of lignin includes a multitude of usually phenolic compounds which are of interest for industry. The aim of this invention is to obtain these phenolic compounds directly from lignin in an amount of economic interest.

This invention is clearly delimited from other methods in that the chemicals produced here are not recombined from synthesis gas. Moreover, in this invention, molecules with a minimum molecular weight of $MW_{min}=78$ g/mol are produced.

In a preferred embodiment, molecules which include at least one benzene ring in their structure are produced. In a further preferred embodiment, molecules which have at least one benzene ring and not more than three benzene rings in their structure are produced. Most preferable is an embodiment in which molecules which contain only one benzene ring in their structure are produced. In the abovementioned preferred embodiments, the benzene ring is used as the base skeleton. In this case, the functional groups and any bonds between benzene rings can be selected as desired. More particularly, the free-radical scavengers which may be used can be integrated into the structure of the chemicals produced. It is possible to obtain a mixture of a plurality of chemicals by the method explained in this invention.

On embodiment envisages converting lignin by means of POM in a suitable reactor. To this end, lignin and POM are dissolved or suspended in a suitable liquid medium. The mixture is brought for a sufficiently long time to conditions which drive the degradation of lignin. The temperature here may be between 0° C. and 500° C., but preferably between 25° C. and 300° C. Lignin can be degraded here under inert gas, oxygen-containing, ozone-containing or hydrogen-containing gas, at pressures up to 300 bar. The pH may be, or be set, within the range of 0-10. The degradation of the lignin should form products from the above-defined group of chemicals. The products are thus obtained here in the region between complete decomposition of the lignin and virtually unchanged lignin. This approach constitutes a new optimization task with regard to suitable POM systems, temperatures, reaction times, etc.

The difficult task of scavenging degradation products can be achieved by methods including the use of free-radical scavengers.

One embodiment thus envisages converting lignin by means of POM in the presence of free-radical scavengers. The procedure here is analogous to the first embodiment. The essential difference is that a free-radical scavenger is added to the reaction mixture at a suitable time. The free-radical scavenger may be present as a solid, liquid or gas. Useful free-radical scavengers generally include all components which, under the given conditions, form free radicals in one or more steps or are already present as free radicals. The free-radical scavengers used may, for example, be substances which can release one or more hydrogen atoms under the conditions used. It is a special feature that POMs can promote the activation of free-radical scavengers (or the formation of free radicals) owing to their usually strong electron (and proton) affinity. It is also possible to use stable radicals, for example nitroxyl radicals, as free-radical scavengers. It is also possible to use free-radical formers, for example dibenzoyl peroxide from the group of the peroxides, as free-radical scavengers.

A further embodiment envisages converting lignin by means of POM in the presence of two liquid phases. The procedure here is analogous to the first embodiment. The essential difference is that two only partly miscible or immiscible liquid phases are in contact with one another during the degradation of lignin. Owing to different solubilities of POM, lignin and lignin-based degradation products in the selected liquid phases, there may be a partial or complete separation of the lignin, POM and lignin-based degradation product components. It is, for example, possible to select a system with two liquid phases, wherein lignin and POM are dissolved or suspended principally in the first liquid phase (e.g. water) and the second liquid phase offers a higher solubility for degradation products of lignin (e.g. chloroform). It is thus possible to remove the desired degradation products of lignin from the reaction medium before they react further in further reactions. It is consequently possible, through suitable selection of two liquid phases, to increase the yield of products compared to a system with only one liquid phase.

A further embodiment thus envisages converting lignin by means of POM in the presence of free-radical scavengers and two liquid phases.

A further embodiment envisages using a metallic catalyst in conjunction with one of the above-mentioned embodiments. Combinations of metallic catalysts, usually palladium, with polyoxometalates have already been studied in a series of oxidations and reductions. An additional metallic catalyst enables the degradation of lignin at lower temperatures and has a positive effect on the selectivity with regard to the target products. It is likewise the case that the yield of desired products can be enhanced using an additional metallic catalyst. It is possible to use a metallic catalyst in combination with polyoxometalates for very substantially complete oxidation of undesired degradation products of lignin in the course of the workup.

To implement the invention in a processing plant, it is, for example, possible to perform the operations described below. The following scheme serves merely to illustrate possible operations and does not make any claim to completeness.

The conversion of lignin according to the above-mentioned embodiments (reaction stage).

Removal of the products from the reaction medium (for example by extraction).

Workup of the products (separation of the product mixture).

Removal of the free-radical scavenger (for example by distillation).

Recycling of the free-radical scavenger.

Oxidation of lignin fragments which have not been converted to target products by means of oxygen to give carbon dioxide and water.

Use of the lignin fragments or lignin which has/have not been converted to target products to generate energy (for example thermal energy from oxidation).

Reoxidation or regeneration of POMs (generally simultaneous with oxidation of lignin fragments).

Recycling of the POM to the reaction stage.

Solids discharge at a sensible point (for example by filtration).

Addition of solvents at a sensible point.

Discharge of solvents at a sensible point.

It is possible to perform the removal of the products simultaneously to the conversion of lignin, for example by extraction in one operation (reactive extraction).

In summary, the core of the invention thus consists, inter alia, in providing a process for directly preparing molecules with a minimum molecular weight of 78 g/mol by the degradation of lignin, lignin derivatives, lignin fragments and/or lignin-containing substances or mixtures in the presence of at least one polyoxometalate in a liquid medium.

In this process, preference is given to using a free-radical scavenger at least at times during the degradation, said free-radical scavenger preferably being a system or a mixture of systems which provides free radicals, for example atomic hydrogen, and/or which prevents or at least hinders the repolymerization or combination reactions of lignin fragments, said free-radical scavenger being usable in gaseous form, liquid form and/or as a solid, and said free-radical scavenger especially preferably being selected from: molecular hydrogen, a peroxide, for example hydrogen peroxide or dibenzoyl peroxide, an alcohol, for example methanol and/or ethanol, a stabilized free radical, for example a nitroxyl radical, an organic acid, for example ascorbic acid, a phenol, for example butylhydroxytoluene, an ether, for example dimethyl ether, an ester, for example ethyl acetate, an anhydride, for example acetic anhydride, or mixtures of such systems.

A second, liquid phase can be added to the mixture, said second liquid phase preferably having a significantly different polarity than the first medium.

It is also additionally possible to use a metallic catalyst, especially from the group of the transition element-containing catalysts, preferably from the group of those containing group VIIIB metals and/or group IB metals, it being possible for said catalyst to be bound on and/or in a preferably porous substrate.

The reaction can be performed under an inert gas, under an oxygen-containing gas phase, under a hydrogen-containing gas phase or under an ozone-containing gas phase, in the pressure range of 0-300 bar, preferably at more than 5 bar.

The polyoxometalate is preferably $H_3PMo_{12}O_{40}$, the liquid medium is water when an alcoholic free-radical scavenger is used, preferably selected from methanol and/or ethanol, the volume ratio of water to alcoholic free-radical scavenger especially preferably being in the range from 1:10 to 10:1, and the pressure preferably being more than 2 bar.

It is generally advantageous when the liquid medium is water, optionally in combination with an alcohol. Between 2-200 g of polyoxometalates can be used per 100 ml of liquid medium, especially preferably between 8-12 g. Thus, preference is given to using concentrations in the range from 0.01 mol/l to 1 mol/l. Typically, the degradation of the lignin to the molecules is followed by a removal of the molecules from the reaction medium, especially preferably by extraction and/or distillation.

Further preferred embodiments are described in the dependent claims.

BRIEF DESCRIPTION OF THE FIGURES

The invention will be illustrated in detail hereinafter with reference to working examples in combination with the FIGURE.

WAYS OF PERFORMING THE INVENTION

Figure 1:
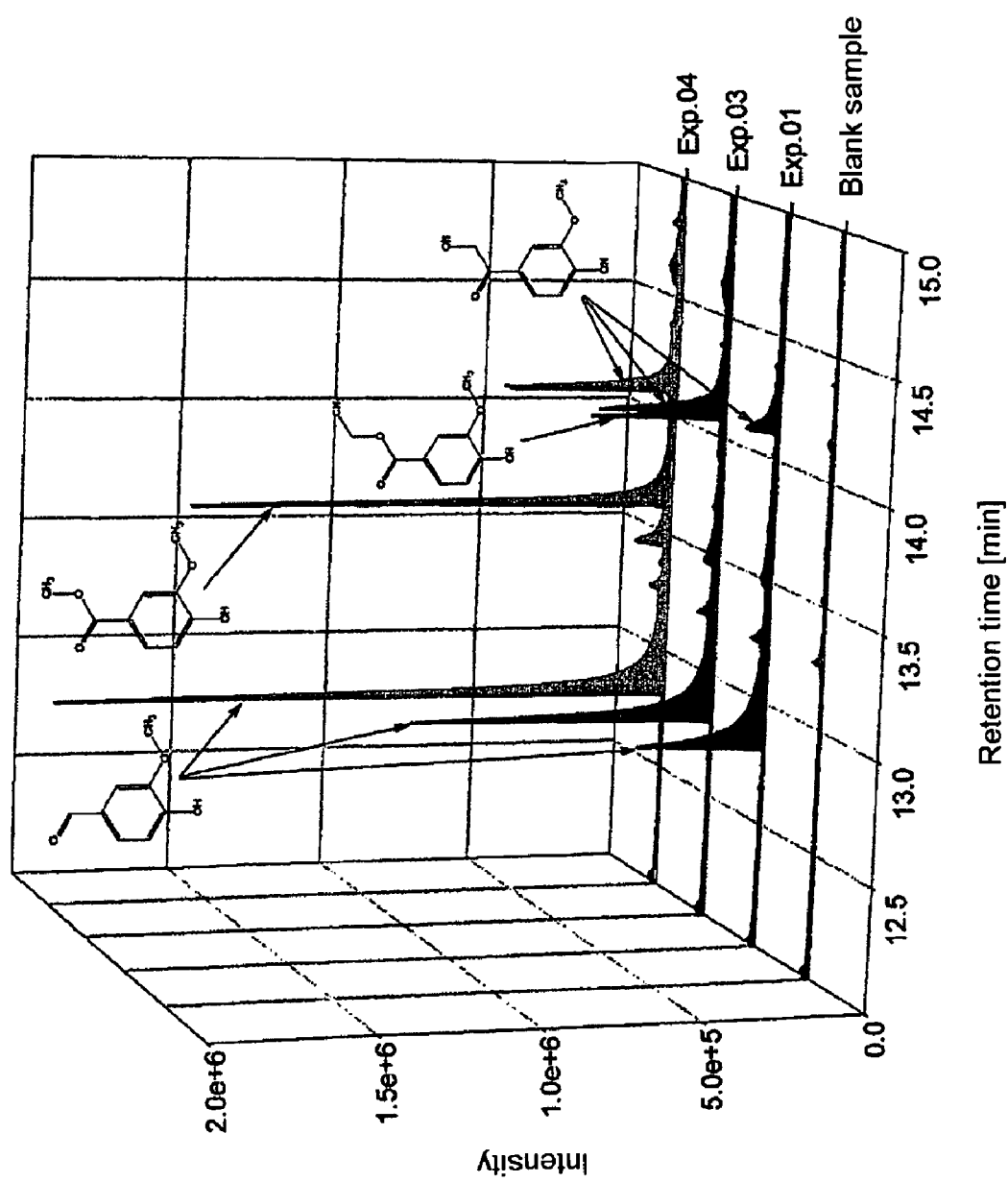
FIG. 1 shows chemicals from the degradation of lignin by means of POM and free-radical scavengers.

The inventive method for producing chemicals from lignin by means of POM and free-radical scavengers is illustrated hereinafter with reference to representative experiments.

More particularly, the effectiveness of the POMs and free-radical scavengers is demonstrated.

Compared to a prior art method, the inventive method can achieve a higher product yield.

Experimental Procedure:

Experiments 01-11 and Blank Sample (see Table 1):

In a typical experiment, 9.13 g of the POM $H_3PMo_{12}O_{40}$ were dissolved in 100 ml of water or a water/alcohol mixture, which corresponds formally to a 0.05 molar solution. This was then transferred into a 500 ml autoclave (Premex Reactor AG, Lengnau, Switzerland). Before the closure of the reactor, 1 g of pulverulent lignin was added. The reaction mixture was then contacted three times with 5 bar of oxygen or nitrogen and vented, in order to displace the air initially present. Finally, the reactor was filled with 5 bar of oxygen or 10 bar of nitrogen. The reaction mixture was heated to 170° C. at a rate of 8 K/min at a stirrer speed of 1200 rad/min. The mixture was kept at 170° C. for 20 minutes. The liquid phase was removed after 20 minutes. This was followed by the sampling through a water-cooled cooling coil. The sample was filtered once and then extracted three times with 10 ml of chloroform. 30 µl of n-decane were added to the organic phase as an internal standard for the GC-MS analysis (Fisons instruments GC8000/MD800; column from Restek Rtx-5MS 30 m×0.25 mm×0.25 µm).

In experiments 03, 04, 08, 09, 10 and 11, free-radical scavengers (methanol, ethanol) were used.

In experiment 02, a second liquid phase in the form of 30 ml of chloroform was added before the closure of the reactor.

In experiment 05, 9.45 g of the POM $Na_3PMo_{12}O_{40}$ were used. In the blank sample, no POM was used.

Experiment 12 and Wu et al. (G. X. Wu, M. Heitz, E. Chornet, *Ind. Eng. Chem. Res.* 33, 718 (March, 1994)) (see table 1):

The experimental method in experiment 12 is kept analogous to Wu et al. 10 g of lignin were dissolved in 100 ml of a 3 molar sodium hydroxide solution. The solution was added to a 500 ml autoclave, and the catalyst system consisting of 500 mg of copper sulfate and 50 mg of iron chloride was added. The reactor was closed and filled three times with oxygen at 10 bar and emptied, in order to displace the air originally present. Subsequently, the reaction vessel was placed under pressure with 13.2 bar of oxygen. The reaction mixture was heated to 170° C. at a rate of 8 K/min at a stirrer speed of 1200 rad/min. The mixture was kept at 170° C. for 20 minutes. The liquid phase was withdrawn after 20 minutes. The sampling was effected through a water-cooled cooling coil.

In experiment 01, lignin was treated in a 0.05 molar aqueous H3PMo12O40 solution under inert gas. In the course of this, the color of the solution changed from yellowish to dark blue. This shows clearly that the polymolybdate used was reduced. By means of GC-MS analysis, 0.56 mg of lignin-based products (principally vanillin) was quantified.

The yield of lignin-based products could be increased by approx. 30% by in situ extraction (cf. experiment 01 with experiment $O_2$). To this end, a second liquid phase (chloroform) was added to the reaction mixture. This has a higher solubility for the desired degradation products and can therefore withdraw any products formed from the actual reaction medium (aqueous POM solution) before possible further reactions destroy the products formed again.

The degradation of lignin with 0.05 molar $H_3PMo_{12}O_{40}$ solution under oxygen (experiment 06) likewise increased the yield compared to the degradation under inert gas (experiment 01). After the experiment under oxygen, in contrast to the experiment under inert gas, only slight discoloration of the solution to yellow-greenish was detected, i.e. the polyoxomolybdate was reduced only very slightly, if at all. This leads to the suspicion that the POM is reoxidizable under the conditions used and, in this case, oxygen is consumed by the POM during the degradation of lignin.

Experiment 07 shows that various lignin types can be used and that the yield of chemicals here is within the same order of magnitude. According to the manufacturer, the lignin from Aldrich (batch No. 09724CE) is a softwood lignin (principally from spruce wood), which was obtained in the Kraft process. The lignin from the Granit® process was, in contrast, obtained from plants utilized in agriculture and therefore has a different chemical structure.

In experiment 05, the POM used was the sodium salt $Na_3PMo_{12}O_{40}$ corresponding to $H_3PMo_{12}O_{40}$. The yield of chemicals is noticeably higher in this experiment. It is therefore found that changes in the POM system used which are slight from a chemical point of view can affect the yield of desired products. The use of a very substantially optimal POM system is therefore of crucial significance for the attainment of high yields.

The positive effect of the free-radical scavenger with regard to the yield of chemicals was demonstrated in experiments 03 and 04 compared to experiment 01 and the blank sample. In experiments 03 and 04, ethanol and methanol were used as free-radical scavengers. Using the free-radical scavengers, the yield was enhanced from 0.56 mg to 1.17 mg in the case of ethanol and to 2.38 mg in the case of methanol.

In the case of the blank sample without POM, no lignin-based products were detectable.

FIG. 1 shows the corresponding GC-MS chromatograms and illustrates that not only are the amounts of vanillin and 4-hydroxyacetyl-2-methoxyphenol produced greater when the free-radical scavengers are used, but novel components are also prepared in amounts comparable to vanillin.

The formation of vanillic acid methyl ester in experiment 04 shows that methanol is incorporated into the product (see equation 11).

Using ethanol as the free-radical scavenger, in contrast, vanillic acid ethyl ester is formed (see equation 12).

In addition, experiments were carried out to verify the mechanism indicated in equations 11 and 12. With deuterated methanol $CD_3OD$, it was possible to show clearly that a methanol radical is incorporated into the vanillic acid methyl ester product. The molecular weight of vanillic acid methyl ester produced in reactions of lignin in the presence of undeuterated methanol was determined by means of GC-MS analysis to be 182 g/mol. Using deuterated methanol, the molecular weight was determined to be 185 g/mol. In addition, it was checked whether the formation of the vanillic acid methyl ester is also possible from vanillin, for example via the reaction route of vanillin vanillic acid vanillic acid methyl ester. The treatment of vanillin in 0.05 molar $H_3PMo_{12}O_{40}$ solution under nitrogen in the presence of methanol gave no products whatsoever. It can consequently be assumed that the acyl radical shown in equations 11 and 12 results from the scission of the Cα-Cβ bond in the lignin.

The formation of the $CH_3O\cdot$ radical from methanol was also considered in more detail. The homolytic scission of the O—H bond in methanol is thermodynamically improbable owing to the high bond energy of 104 kcal/mol. It was, however, found that methanol in aqueous $H_3PMo_{12}O_{40}$ solution under nitrogen is converted partly to dimethyl ether. The homolytic scission of the C—O bond in dimethyl ether is possible owing to the relatively low bond energy of 84 kcal/mol. It is consequently possible that methanol can form free radicals via acid-catalyzed ether formation and is thus considered to be a free-radical scavenger in the context of this invention. The direct addition of dimethyl ether as a free-radical scavenger for conversion of lignin in aqueous $H_3PMo_{12}O_{40}$ solution under nitrogen and in the absence of methanol results in the production of a small amount of vanillic acid methyl ester. It was thus shown that dimethyl ether is directly active as a free-radical scavenger, and the homolytic scission of dimethyl ether and the associated formation of vanillic acid methyl ester is possible.

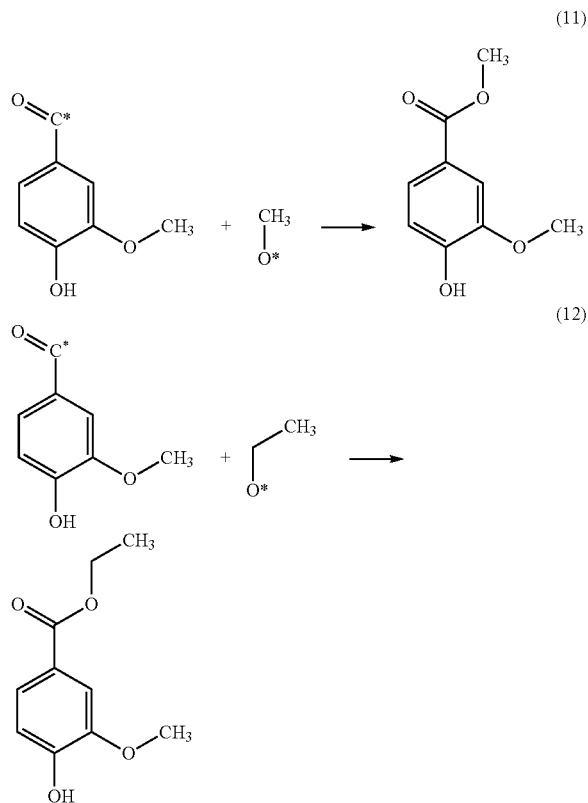

In order to be able to compare the results of the degradation of lignin by means of POM and free-radical scavengers with the prior art, the method used by Wu et al. (benchmark) was applied to the lignin from Aldrich used in our examples.

A comparison of the results revealed that the yield of lignin-based chemicals using the softwood lignin is very much lower compared to Wu et al. (~one factor of ten). The reason for this may be the use of a very different lignin type. The lignin from Sigma-Aldrich used in our study is, according to the manufacturer, a typical softwood lignin which was isolated from spruce wood by means of the Kraft process. Wu et al. used, in contrast, a self-produced lignin type produced from hardwood by means of steam digestion. It is known that hardwood lignin has a very much higher proportion of syringyl units (~50%). The comparatively high proportion of syringyl units is also reflected in the results of Wu et al. in the considerable amount of syringaldehyde produced (7.8% by weight). Softwood lignin (from the spruce) possesses, in contrast, a very great proportion of guaiacyl units (~90%). This corresponds with our results, in which only traces of syringaldehyde were formed. It is additionally known that the degradation of hardwood lignin proceeds very much more easily and rapidly than the degradation of softwood lignin. In addition, the hardwood lignin produced by Wu et al. was not characterized fully. The composition of the acid-insoluble lignin is reported by Wu et al. as: Klason lignin=84.7%; acid-soluble lignin=3.0% and others (unknown)=12.3%.

An economically viable process requires a reliable and inexpensive lignin source. It therefore appears to be advisable to use softwood lignin, which is obtainable in large amounts, as a starting material for chemical production. As already indicated, softwood lignin is obtained as a waste product in papermaking (for example in the Kraft or sulfite process). The method of Wu et al. is therefore applied below to the lignin available to us as a benchmark.

A comparison of experiment 10 in which lignin was converted under oxygen in the presence of POM and free-radical scavenger with the prior art method (experiment 12) shows that a higher product yield is achieved with the inventive method. The chemicals produced are principally vanillin (16.5 mg) and vanillic acid methyl ester (13.5 mg).

In experiment 11, poplar lignin was used. The product yield is likewise in the region of 3.5% by weight. The main products here are, however, vanillin (5.0 mg), vanillic acid methyl ester (6.2 mg), syringaldehyde (8.2 mg) and syringic acid methyl ester (12.2 mg), corresponding to the chemical structure of poplar lignin with a relatively high proportion of syringyl units.

It should be noted that the examples adduced in this document represent the first test series. The achievement of the comparatively higher yields is therefore particularly promising, since the inventive method has not yet been optimized. In view of the numerous possible combinations of POM, free-radical scavengers and ultimately also lignin types, there is still a very large amount of room for improvement of the yields. In addition, some reaction technology solutions, for example in situ extraction, are still available. The potential becomes clear in a comparison of experiments 06 and 10, among others. Here, the yield of chemicals was increased by a factor of 30 solely through the use of an aqueous methanol solution. One advantage of the invention presented here also lies in the possibility of preparing different chemicals depending on the free-radical scavenger. For instance, vanillic acid methyl ester is formed in the case of use of methanol, and vanillic acid ethyl ester in the case of use of ethanol. It consequently appears possible, through suitable combinations of POM and free-radical scavenger, to be able to crucially influence not just the yield but also the selectivity for a target product.

TABLE 1

Results for production of chemicals from lignin by means of POM and free-radical scavenger compared to conventional methods.

| Experiment | Catalytic system | Medium | Gas | Lignin type | Products [mg] GC-MS | % by wt.*) |
|---|---|---|---|---|---|---|
| 01 | $H_3PMo_{12}O_{40}$ (9.13 g) | $H_2O$ (100 ml) | $N_2$ (10 bar) | Aldrich (1 g) | 0.56 | 0.06 |
| 02 | $H_3PMo_{12}O_{40}$ (9.13 g) | $H_2O$ (100 ml) $CHCl_3$ (30 ml) | $N_2$ (10 bar) | Aldrich (1 g) | 0.74 | 0.08 |
| 03 | $H_3PMo_{12}O_{40}$ (9.13 g) | $H_2O$ (60 ml) $C_2H_5OH$ (40 ml) | $N_2$ (10 bar) | Aldrich (1 g) | 1.17 | 0.13 |
| 04 | $H_3PMo_{12}O_{40}$ (9.13 g) | $H_2O$ (60 ml) $CH_3OH$ (40 ml) | $N_2$ (10 bar) | Aldrich (1 g) | 2.38 | 0.26 |
| 05 | $Na_3PMo_{12}O_{40}$ (9.45 g) | $H_2O$ (100 ml) | $O_2$ (5.1 bar) | Aldrich (1 g) | 1.47 | 0.16 |
| 06 | $H_3PMo_{12}O_{40}$ (9.13 g) | $H_2O$ (100 ml) | $O_2$ (5.1 bar) | Aldrich (1 g) | 0.97 | 0.11 |
| 07 | $H_3PMo_{12}O_{40}$ (9.13 g) | $H_2O$ (100 ml) | $O_2$ (5.1 bar) | Granit (1 g) | 0.59 | 0.06 |
| 08 | $H_3PMo_{12}O_{40}$ (9.13 g) | $H_2O$ (60 ml) $CH_3OH$ (40 ml) | $O_2$ (5.1 bar) | Aldrich (1 g) | 9.5 | 1.04 |
| 09 | $H_3PMo_{12}O_{40}$ (9.13 g) | $H_2O$ (40 ml) $CH_3OH$ (60 ml) | $O_2$ (5.1 bar) | Aldrich (1 g) | 25.63 | 2.79 |
| 10 | $H_3PMo_{12}O_{40}$ (9.13 g) | $H_2O$ (20 ml) $CH_3OH$ (80 ml) | $O_2$ (5.1 bar) | Aldrich (1 g) | 32.73 | 3.57 |
| 11 | $H_3PMo_{12}O_{40}$ (9.13 g) | $H_2O$ (20 ml) $CH_3OH$ (80 ml) | $O_2$ (5.1 bar) | Poplar (1 g) | 34.22 | 3.64 |
| 12 | $CuSO_4/FeCl_3$ (0.5 g/0.05 g) | $H_2O$ (100 ml) NaOH (12 g) | $O_2$ (13.2 bar) | Aldrich (10 g) | 145 | 1.58 |
| Wu et al. | $CuSO_4/FeCl_3$ (0.5 g/0.05 g) | $H_2O$ (100 ml) NaOH (14.7 g) | $O_2$ (13.8 bar) | Hardwood (10 g) | | 12.9 |
| Blank sample | none | $H_2O$ (60 ml) $C_2H_5OH$ (40 ml) | $N_2$ (10 bar) | Aldrich (1 g) | 0 | 0 |

*)Based on dry lignin

The invention claimed is:

1. A process for directly preparing molecules with a minimum molecular weight of 78 g/mol by the degradation of lignin, lignin derivatives, lignin fragments and/or lignin-containing substances or mixtures in the presence of at least one polyoxometalate in a liquid medium.

2. The process as claimed in claim 1, wherein a free-radical scavenger is used at least at times during the degradation, said free-radical scavenger being a system or a mixture of systems which provides free radicals and/or which prevents or at least hinders the repolymerization or combination reactions of lignin fragments, said free-radical scavenger being usable in gaseous form, liquid form and/or as a solid.

3. The process as claimed in claim 1, wherein a second, liquid phase is added to the mixture, said second liquid phase preferably having a significantly different polarity than the first medium.

4. The process as claimed in claim 1, wherein a metallic catalyst is additionally used, it being possible for said catalyst to be bound on and/or in a preferably porous substrate.

5. The process as claimed in claim 1, wherein the reaction is performed under an inert gas, under an oxygen-containing gas phase, under a hydrogen-containing gas phase or under an ozone-containing gas phase, in the pressure range of 0-300 bar.

6. The process as claimed in claim 1, wherein the reaction is performed within a temperature range of 0° C.-500° C., preferably between 25° C. and 300° C.

7. The process as claimed in claim 1, wherein at least one of the polyoxometalates used has a Keggin structure.

8. The process as claimed in claim 1, wherein at least one of the polyoxometalates used is of the form (I) or (II):

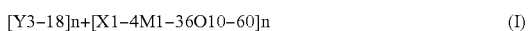

where each "X" is selected from the group of the atoms or molecules having fewer than 4 atoms, each "M" is selected from the group of the metals, "Y" represents countercations and "n" is an integer.

9. The process as claimed in claim 1, wherein the polyoxometalate is of the form (III):

in which "X" is selected from the group consisting of Si, P and Ge, in which "M" is selected from the group consisting of Mo, V and W, where the countercations "Y" are selected from the group consisting of H, Zn, Co, Cu, Bi, Na, Li, K, Rb, Cs, Ba, Mg, Sr, ammonium, C1 12-alkylammonium and C1 12-alkylamine, and combinations thereof, and "n" and "y" are integers.

10. The process as claimed in claim 1, wherein the polyoxometalate is bound on a substrate.

11. The process as claimed in claim 1, wherein the molecules have at least one benzene ring and at most three benzene rings.

12. The process as claimed in claim 1, wherein at least one of the molecules is vanillin or a vanillin derivative.

13. The process as claimed in claim 1, wherein the polyoxometalate is H3PMo12O40, the liquid medium is water and an alcoholic free-radical scavenger is used.

14. The process as claimed in claim 1, wherein the liquid medium is water.

15. The process as claimed in claim 1, wherein a polyoxometalate or a polyoxometalate mixture is dissolved in the liquid medium.

16. The process as claimed in claim 1, wherein the molecules are removed from the reaction medium, during or after the degradation of the lignin to the molecules.

17. The process as claimed in claim 1, wherein a free-radical scavenger is used at least at times during the degradation, said free-radical scavenger being a system or a mixture of systems which indirectly or directly provides free radicals and which prevents or at least hinders the repolymerization or combination reactions of lignin fragments, said free-radical scavenger being usable in gaseous form, in liquid form and/or as a solid, and said free-radical scavenger being selected from: molecular hydrogen, a peroxide, an alcohol, stabilized free radical, an organic acid, a phenol, an ether, an ester, an anhydride, or mixtures of such systems.

* * * * *